(12) United States Patent
Mohammed

(10) Patent No.: US 7,451,075 B2
(45) Date of Patent: Nov. 11, 2008

(54) COMPRESSED SPEECH LEXICON AND METHOD AND APPARATUS FOR CREATING AND ACCESSING THE SPEECH LEXICON

(75) Inventor: Yunus Mohammed, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 851 days.

(21) Appl. No.: 09/751,871

(22) Filed: Dec. 29, 2000

(65) Prior Publication Data

US 2002/0123882 A1 Sep. 5, 2002

(51) Int. Cl.
G06F 17/28 (2006.01)
G06F 17/21 (2006.01)

(52) U.S. Cl. ............................... 704/7; 704/10
(58) Field of Classification Search ............ 704/10, 704/7, 270.1
See application file for complete search history.

(56) References Cited

U.S. PATENT DOCUMENTS

| | | | | |
|---|---|---|---|---|
| 4,771,401 A | * | 9/1988 | Kaufman et al. | 715/533 |
| 4,914,590 A | * | 4/1990 | Loatman et al. | 704/8 |
| 5,621,859 A | | 4/1997 | Schwartz et al. | 704/256 |
| 5,630,121 A | * | 5/1997 | Braden-Harder et al. | 707/102 |
| 5,696,980 A | * | 12/1997 | Brew | 704/273 |
| 5,748,974 A | | 5/1998 | Johnson | 704/9 |
| 5,768,580 A | * | 6/1998 | Wical | 707/102 |
| 5,778,405 A | * | 7/1998 | Ogawa | 715/259 |
| 5,799,273 A | | 8/1998 | Mitchell et al. | 704/235 |
| 5,819,220 A | * | 10/1998 | Sarukkai et al. | 704/270.1 |
| 5,864,863 A | * | 1/1999 | Burrows | 707/103 R |
| 5,865,626 A | | 2/1999 | Beattie et al. | 434/185 |
| 5,913,192 A | * | 6/1999 | Parthasarathy et al. | 704/256 |
| 5,933,525 A | * | 8/1999 | Makhoul et al. | 382/186 |
| 5,991,720 A | | 11/1999 | Galler et al. | 704/256 |
| 5,995,928 A | | 11/1999 | Nguyen et al. | 704/251 |
| 6,018,708 A | * | 1/2000 | Dahan et al. | 704/244 |
| 6,021,409 A | * | 2/2000 | Burrows | 707/102 |
| 6,044,347 A | | 3/2000 | Abella et al. | 704/272 |
| 6,064,959 A | | 5/2000 | Young et al. | 704/251 |
| 6,076,056 A | * | 6/2000 | Huang et al. | 704/254 |
| 6,138,098 A | | 10/2000 | Shieber et al. | 704/257 |
| 6,243,678 B1 | * | 6/2001 | Erhart et al. | 704/249 |

(Continued)

OTHER PUBLICATIONS

Isolated-word sentence recognition using probabilistic context-free grammar By: G.J.F. Jones et al. Eurospeech 91, 2nd European Conf. On Speech Comm. and Tech. Proceedings p. 487-9, vol. 2.

(Continued)

Primary Examiner—Michael N Opsasnick
(74) Attorney, Agent, or Firm—Joseph R. Kelly; Westman, Champlin & Kelly, P.A.

(57) ABSTRACT

A compressed lexicon is built by receiving a word list, which includes word-dependent data associated with each word in the word list. A word is selected from the word list. A hash value is generated based on the selected word, and the hash value identifies an address in a hash table which, in turn, is written with a location in lexicon memory that is to hold the compressed form of the selected word, and the compressed word-dependent data associated with the selected word. The word is then encoded, or compressed, as is its associated word-dependent data. This information is written at the identified location in the lexicon memory.

20 Claims, 6 Drawing Sheets

U.S. PATENT DOCUMENTS

| | | | |
|---|---|---|---|
| 6,314,399 B1 | 11/2001 | Deligne et al. | 704/257 |
| 6,321,372 B1 * | 11/2001 | Poirier et al. | 717/122 |
| 6,374,226 B1 | 4/2002 | Hunt et al. | 704/275 |
| 6,377,913 B1 | 4/2002 | Coffman et al. | 704/8 |
| 6,377,925 B1 | 4/2002 | Greene et al. | 704/271 |
| 6,456,974 B1 | 9/2002 | Baker et al. | 704/270.1 |
| 6,466,909 B1 | 10/2002 | Didcock | 704/260 |
| 6,470,306 B1 * | 10/2002 | Pringle et al. | 704/3 |
| 6,487,533 B2 | 11/2002 | Hyde-Thompson et al. | 704/260 |
| 6,513,009 B1 | 1/2003 | Comerford et al. | 704/270 |
| 6,526,381 B1 | 2/2003 | Wilson | 704/251 |
| 6,535,886 B1 | 3/2003 | Koontz | 707/102 |
| 6,618,703 B1 | 9/2003 | Peres et al. | 704/270 |
| 6,636,831 B1 | 10/2003 | Profit et al. | 704/275 |
| 7,027,975 B1 * | 4/2006 | Pazandak et al. | 704/9 |
| 2002/0138265 A1 | 9/2002 | Stevens et al. | 704/251 |

OTHER PUBLICATIONS

Context-free grammar driven, frame synchronous HMM-based continuous speech recognition methods using word spotting By: S. Nakagawa et al. Transactions of the Inst. of Electr., Information and Communication Engineers D-II vol. J76D-II, No. 7, p. 1329-36.

One-pass continuous speech recognition directed by generalized LR parsing By: K. Kita et al., ICSLP 94. 1994 International Conference on Spoken Language Processing.

The Aristotle speech recognition system By: C. Waters et al., Progress in Connectionist-Based Information Systems.

A context-free grammar compiler for speech understanding systems By: M.K. Brown et al. ICSLP 94. 1994 International Conference on Spoken Language Processing Part. vol. 1, p. 21-4.

Efficient word-graph parsing and search with a stochastic context-free grammar By: C.J. Waters et al., 1997 IEEE Workshop on Automatic Speech Recognition and Understanding Proceedings.

Dynamic programming parsing for context-free grammar in continuous speech recognition By: H. Ney, IEEE Transactions on Signal Processing, vol. 39, No. 2, p. 336-40.

Using a stochastic context-free grammar as a language model for speech recognition By: D. Jurafsky, et al., 1995 International Conference on Acoustics, Speech, and Signal Processing. Part 1, p. 189-92, vol. 1.

Development of an effective context-free parser for continuous stochastic languages By: L.R. Strydom et al., AFRICON 96'. Incorporating AP-MTT-96 and COMSIG-96.

Reliable utterance segment recognition by integrating a grammar with statistical language constraints By: H. Tsukada et al., Speech Communication vol. 26, No. 4, p. 299-309.

Active middleware services in a decision support system for managing highly available distributed resources By: S.A. Fakhouri et al., International Conf. On Distributed Systems Platforms and Open Distributed Processing. Lecture Notes in Computer Science vol. 1795, p. 349-71.

Improving scalability of event-driven distributed objects architectures. By: D. Mencnarowski et al., Poland Journal: Software-Practice and Experience vol. 30, No. 13, p. 1509-29.

Improved spelling recognition using a tree-based fast lexical match. By: C.D. Mitchell et al., 1999 IEEE International Conf. On Acoustics, Speech and Signal Proceedings. vol. 2, p. 597-600.

Event management components for the 3/sup rd/ generation OSS By: S, Desrochers et al., Proceedings of Network Operations and Management Symposium Conference Date: Apr. 10-14, 2000 Conference Location: Honolulu, HI, USA.

A context-dependent similarity measure for strings By: E. Tanaka. Transactions of the Institute of Electronics and Communication Engineers of Japan, Part A, VO . . . J67A, No. 6, p. 612-13.

Ready: a high performance event notification service By: Gruber, R.E. et al. Proceedings of the 16th International Conference on Data Engineering Conference Sponsor: IEEE Comput. Soc. Tech. Committee on Data Eng. Conference Date: Feb. 29-Mar. 3, 2000 Conference Location: San Diego, CA, USA.

An event notification framework based on Java and CORBA By: Tomono, M. Japan Conference Title: Integrated Network Management VI. Distributed Management for the Networked Millennium.

Mobile streams By: Ranganathan, M et al., Proceedings of the Sixth Annual Tcl/Tk Conference p. 203-4 Publisher: USENIX Assoc, Berkeley, CA, USA Publication Date: 1998.

A flexible and recoverable client/server database event notification system By: Hanson, E.N. et al., VLDB Journal vol. 7, No. 1, p. 12-24, 1998.

Using events to build distributed applications Author(s) : Bacon, J. et al., Second International Workshop on Services in Distributed and Networked Environments Conference Sponsor: IEEE Comput. Soc. Tech. Committee on Distributed Process Conference Date: Jun. 5-6, 1995.

High-Performance Alphabet Recognition, IEEE Speech and Audio Processing, By: Philipos C. Loizue et al. Nov. 1996, vol. 4, No. 6, pp. 430-445.

Speaker-Independent Name Retrieval From Spellings Using a Database of 50,000 Names, By: Ronald A. Cole et al., 1991 International Conference on Acoustics, Speech, and Signal Processing vol. 5, pp. 325-328.

IBM Voicetype Software, By: R. Fletcher, IEE Colloquium on the Language Toolkit Engineers in Business.

Temporal Decomposition and Acoustic-Phonetic Decoding for the Automatic Recognition of Continuous Speech By: P. Deleglise et al. 9th International Conference on Pattern Recognition. vol. 11, pp. 839-841.

Improving Recognizer Acceptance Through Robust, Natural Speech Repair By: Arthur E. McNair et al., 1994 International Conference on Spoken Language Processing. pp. S22-15.1-S22-15.4.

Automated Directory Listing Retrieval System Based on Isolated Word Recognition By: Bernd Aldefeld et al., Proceedings of the IEEE, vol. 68, No. 11, Nov. 80 pp. 1364-1379.

Empirical evaluation of interactive multimodal error correction, By: Suhm, B., 1997 IEEE Workshop on Automatic Speech Recognition and Understanding Proceedings.

Noise robust speech recognition makes in-car navigation safe and affordable By: Smolders, J. et al. 'Steps Forward'. Proceedings of the Second World Congress on Intelligent Transport Systems '95 Yokohama Part vol. 2 p. 601-4 vol. 2.

Building a listener engine: a Smalltalk interface to speech recognition By: LaLonde, W., Pugh, J. Journal: Journal of Object Oriented Programming (JOOP) vol. 10, No. 7, 1997-1998.

LEAP: Language Enabled Application By: Alabiso, B. ; Kronfeld, A. First International Workshop on Human-Computer Conversation. Draft Proceedings p. 15.

Tools for developing voice-operated applications By: Newstadt, R.E., Speech Technology vol. 4, No. 4, p. 62-6.

Examining Microsoft's Speech SDK By: Davis, P., Dr. Dobb's Journal vol. 24, No. 7, p. 86, 88-90. 1999.

Speech processing technology towards practical use By: Shirai, K.; Kobayasshi, T.; Kudo, I., Joho Shori vol. 38, No. 11 p. 971-5.

Recent improvements on Microsoft's trainable text-to-speech system-Whistler By: Haung, X et al., 1997 IEEE International Conference on Acoustics, Speech and Signal Processing (Cat. No. 97CB36052) Part vol. 2 p. 959-62, vol. 2.

Software text-to-speech By: Hallahan, W.J.; Vitale, A.J., Journal: International Journal of Speech Technology vol. 1, No. 2 p. 121-34.

Japanese text-to-speech software (FLUET) based on waveform synthesis method By: Hakoda, K.; Tsukada, H.; Hirokawa, T.; Yoshida, Y.; Mizuno, H.

DECtalk Software: text-to-speech technology and implementation By: Hallahan, W.I., : Digital Technical Journal vol. 7, No. 4 p. 5-19.

The InfoPad user interface By: Burstein, A. et al., Digest of Papers. COMPCON '95. Technologies for the Information Superhighway.

\* cited by examiner

COMPRESSED SPEECH LEXICON AND METHOD AND APPARATUS FOR CREATING AND ACCESSING THE SPEECH LEXICON

The present application is based on and claims the benefit of U.S. Provisional Patent Application Ser. No. 60/219,861, filed Jul. 20, 2000, the content of which is hereby incorporated by reference in its entirety.

BACKGROUND OF THE INVENTION

The present invention deals with a lexicon for use by speech recognition and speech synthesis technology. In particular, the present invention relates to an apparatus and method for compressing a lexicon and accessing the compressed lexicon, as well as the compressed lexicon data structure.

Speech synthesis engines typically include a decoder which receives textual information and converts it to audio information which can be synthesized into speech on an audio device. Speech recognition engines typically include a decoder which receives audio information in the form of a speech signal and identifies a sequence of words from the speech signal.

In speech recognition and text-to-speech (speech synthesis) systems, a lexicon is used. The lexicon can contain a word list and word-dependent data, such as pronunciation information and part-of-speech information (as well as a wide variety of other information). The lexicon is accessed by a text-to-speech system, for example, in order to determine the proper pronunciation of a word which is to be synthesized.

In such systems (speech recognition and text-to-speech) a large vocabulary lexicon is typically a highly desirable feature. However, it is also desirable to provide speech recognition and speech synthesis tasks very quickly. Due to the large number of words which can be encountered by such systems, the lexicon can be extremely large. This can take an undesirable amount of memory.

Compression of data, however, brings its own disadvantages. For example, many compression algorithms make it cumbersome to recover the compressed data. This often requires an undesirable amount of time, especially with respect to the desired time limitations imposed on speech recognition and speech synthesis tasks. Further, since a conventional lexicon may contain in excess of 100,000 words, along with and each word's associated word-dependent data, it can take an undesirable amount of time to build the compressed lexicon based upon an input text file containing the uncompressed lexicon. Similarly, many compression algorithms can render the compressed text non-extensible, or can make it quite cumbersome to extend the compressed data. However, it may be desirable to change the lexicon, or modify the lexicon by adding or deleting words. Similarly, it may be desirable to add additional word-dependent data to the lexicon or delete certain types of word-dependent data from the lexicon. Therefore, limiting the extensibility of the lexicon is highly undesirable in speech-related systems.

SUMMARY OF THE INVENTION

A compressed lexicon is built by receiving a word list, which includes word-dependent data associated with each word in the word list. A word is selected from the word list. A hash value is generated based on the selected word, and the hash value identifies an address in a hash table which, in turn, is written with a location in lexicon memory that is to hold the compressed form of the selected word, and the compressed word-dependent data associated with the selected word. The word is then encoded, or compressed, as is its associated word-dependent data. This information is written at the identified location in the lexicon memory.

In one embodiment, each type of word-dependent data which is compressed and written in the lexicon memory is written in a word-dependent data portion and has an associated header portion. The header portion includes a last data portion indicator which indicates whether the associated word dependent data portion is the last one associated with the selected word. The header also includes a word-dependent data type indicator indicating the type of word-dependent data stored in the associated word-dependent data portion.

Another embodiment of the present invention includes accessing a compressed lexicon. In that embodiment, a word is received and an index is accessed to obtain a word location in the compressed lexicon that contains information associated with the received word. Encoded word information is read from the word location and is decoded. The header information can be read as well, to determine the type of word-dependent data being decoded as well as whether any additional word-dependent data is associated with the received word.

The present invention can be implemented as a compressed lexicon builder and a compressed lexicon accesser for building and accessing the compressed lexicon discussed above.

The present invention can also be implemented as a data structure for a compressed lexicon which includes a word portion storing a compressed word, a word-dependent data portion storing a first type of compressed word-dependent data, and a header portion associated with each word-dependent data portion storing a type indicator indicating the type of word-dependent data in the associated word-dependent data portion and a last field indicator indicating whether the word-dependent data portion is a last word-dependent data portion associated with the compressed word.

DETAILED DESCRIPTION OF ILLUSTRATIVE EMBODIMENTS

Figure 1:
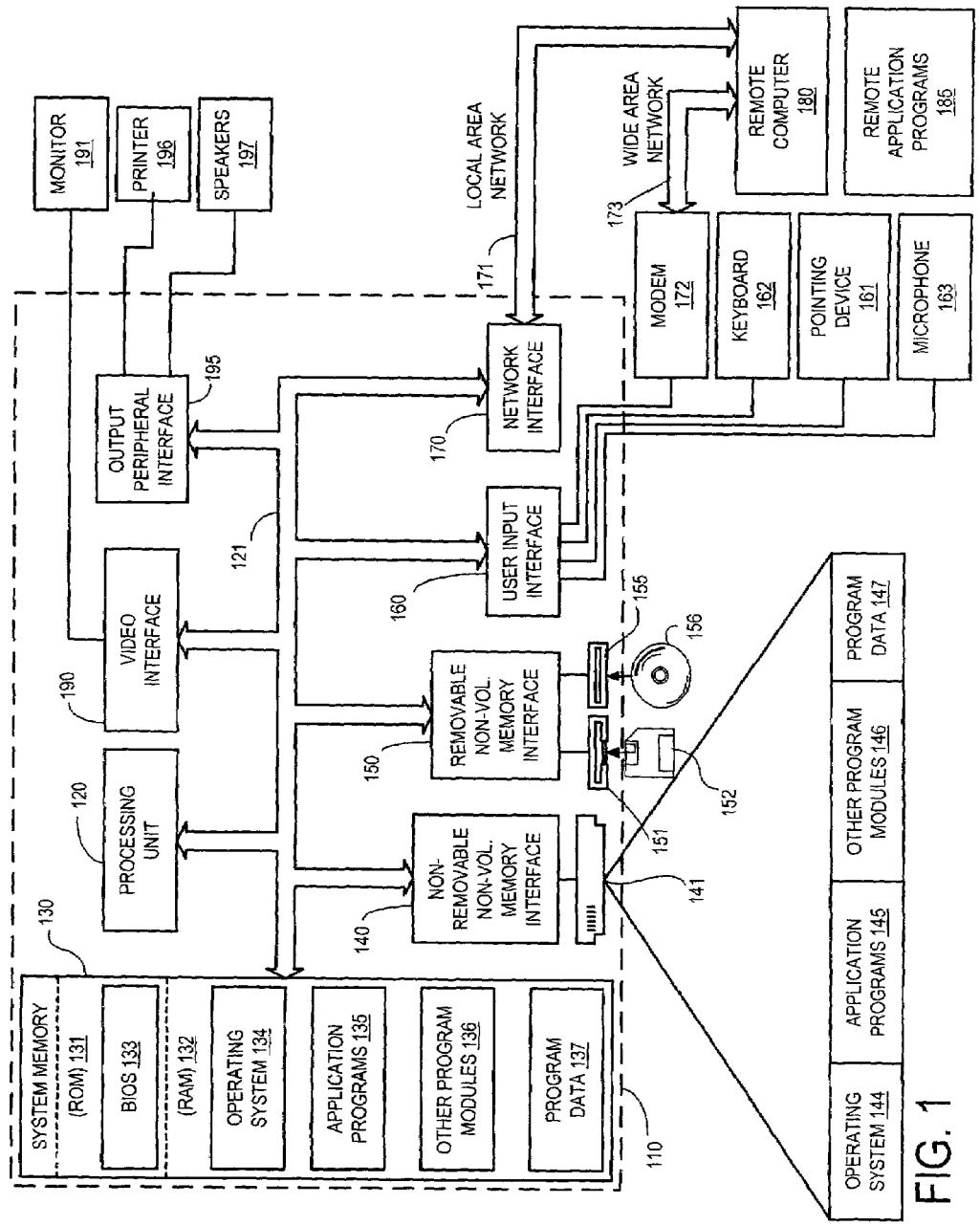
FIG. 1 is a block diagram of the general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100. Communication media typically embodies computer readable instructions, data structures, program modules or other data in a modulated data signal such as a carrier WAV or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way o example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
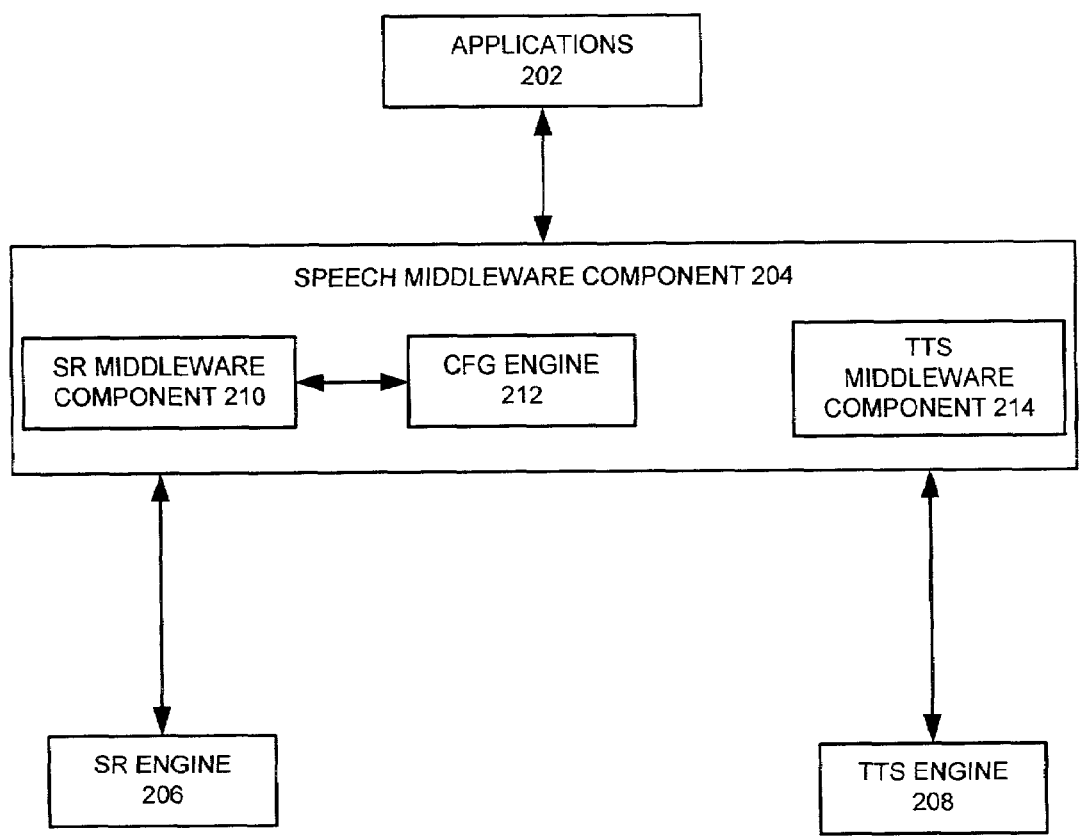
FIG. 2 is a block diagram of a speech recognition system in accordance with one embodiment of the present invention.

FIG. 2 is a more detailed block diagram of a speech system 200 in accordance with one embodiment of the of the present invention. It should be noted that speech system 200 can be incorporated into the environment illustrated in FIG. 1. Speech system 200 includes one or more speech recognition or speech synthesis (TTS) applications 202, speech middleware component 204, one or more speech recognition engines 206 and one or more text-to-speech engines (synthesizers) 208.

In one illustrative embodiment, speech middleware component 204 is implemented in the operating system 134 illustrated in FIG. 1. Speech middleware component 204, as shown in FIG. 2, includes speech recognition middleware component 210, context free grammar (CFG) engine 212 and text-to-speech middleware component 214.

Briefly, in operation, speech middleware component 204 resides between applications 202 and engines 206 and 208. Applications 202 can be speech recognition and speech synthesis applications which desire to invoke engines 206 and 208. In doing so, applications 202 make calls to speech middleware component 204 which, in turn, makes calls to the appropriate engines 206 and 208 in order to have speech recognized or synthesized. For example, applications 202 may provide the source of audio data for speech recognition. Speech middleware component 204 passes that information to speech recognition engine 206 which simply recognizes the speech and returns a recognition result to speech recognition middleware component 210. Speech recognition middleware component 210 places the result in a desired format and returns it to the application 202 which requested it. Similarly, an application 202 can provide a source of textual data to be synthesized. TTS middleware component 214 assembles that data, and provides it to TTS engine 208, for synthesis. TTS engine 208 simply synthesizes the data and returns audio information to TTS middleware component 214, which handles spooling of that information to an audio device, writing that information to memory, or placing that information in any other desired location, as specified by the application 202 which requested it.

CFG engine 212, briefly, assembles and maintains grammars which are to be used by speech recognition engine 206. This allows multiple applications and multiple grammars to be used with a single speech recognition engine 206.

In one embodiment, both engines 206 and 208 may wish to access a lexicon to perform recognition or synthesis, respectively. In one illustrative embodiment, speech middleware component 204 contains a lexicon which can be used by both engines. In that case, the engines 206 and 208 communicate with speech middleware component 204, illustratively through methods exposed by interfaces on speech middleware component 204. Thus, the compressed lexicon in accordance with one aspect of the present invention can be implemented in speech middleware component 204 as an instantiated object which is accessible by the engines 206 and 208.

Of course, it will be appreciated that the inventive aspects of the present invention with respect to the compressed lexicon and the apparatus and method for creating and accessing the compressed lexicon are independent of the specific structure shown in FIG. 2. FIG. 2 illustrates but one illustrative environment in which the inventive aspects of the present invention can be practiced.

Figure 3:
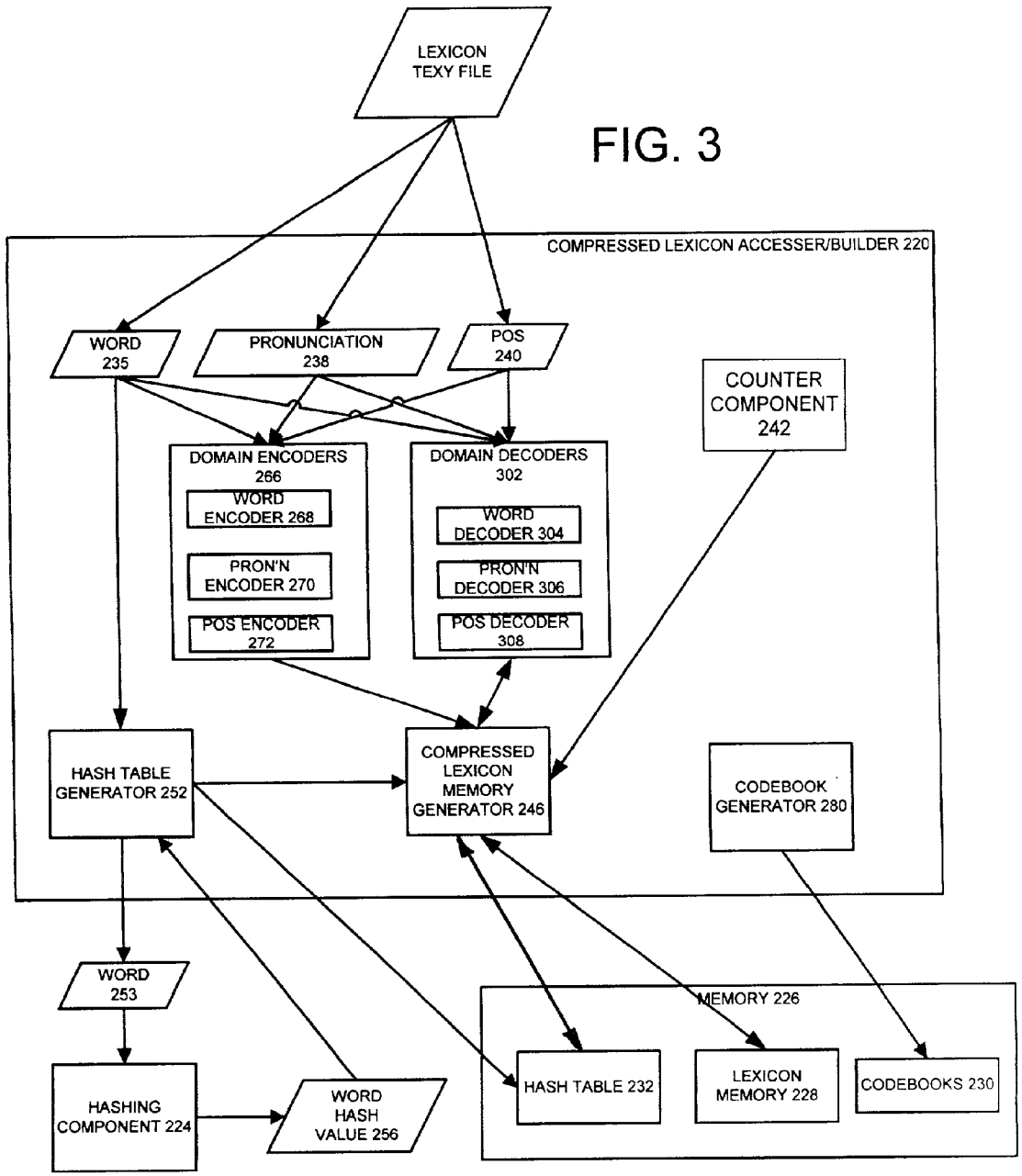
FIG. 3 is a more detailed block diagram of a compressed lexicon building and accessing component in accordance with one embodiment of the present invention.

FIG. 3 illustrates a compressed lexicon accessing and building component 220 in accordance with one embodiment of the present invention. Briefly, component 220 in one illustrative embodiment receives a lexicon text file 222 which contains a word list (with the words in the lexicon) as well as the word-dependent data associated with the words in the word list. Component 220 receives the text file and accesses a hashing component 224 with certain portions of that text file. Component 220 then creates the compressed lexicon in memory 226. Specifically, the compressed lexicon 228 and its associated codebooks 230 are stored in memory 226, as is an indexing table (or hash table) 232 which is used to index into lexicon memory 228.

Figure 4:
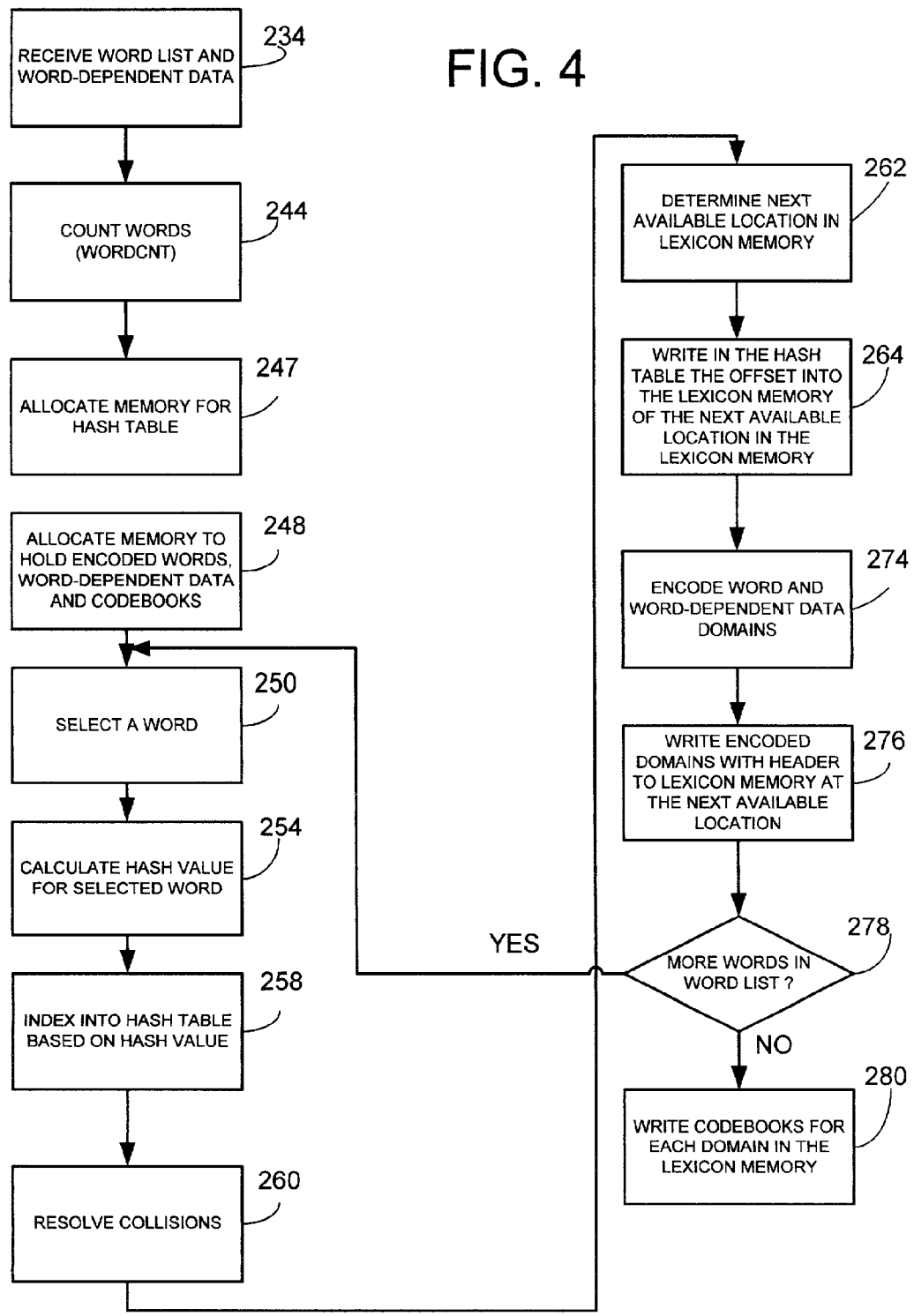
FIG. 4 is a flow diagram illustrating the creation of a compressed lexicon in accordance with one embodiment of the present invention.

More specifically, FIG. 4 is a flow diagram which illustrates the operation of component 220 in creating the compressed lexicon in accordance with one embodiment of the present invention. Component 220 first receives the word list and word dependent data, as indicated by block 234 in FIG. 4. As described above, the word list and word-dependent data can be provided to component 220 as a text file, for example, wherein each word in the word list is followed by its associated word-dependent data.

In one specific embodiment, lexicon text file 222 is composed of a plurality of entries. Each entry includes a word 236 (in FIG. 3) in the word list, along with its associated word-dependent data. In the embodiment discussed herein, there are two types of word-dependent data. The first type of word-dependent data is a pronunciation 238 and the second type of word-dependent data is a part-of-speech 240. Of course, it will be recognized that a wide variety of other types of word-dependent data can be used, and may be useful in a compressed lexicon in a speech recognition or speech synthesis context. The two types of word-dependent data described herein are being described for illustrative purposes only and are not intended to limit the scope of the invention.

In any case, a counter component 242 in component 220 first counts the number of words contained in the word list provided in text file 222. This is indicated by block 247 in FIG. 4. For purposes of illustration, this number is designated WORDCNT. Counter component 242 provides the WORDCNT to compressed lexicon memory generator 246 in FIG. 3. Memory generator 246 then allocates in memory 226 a hash table 232) which is sufficiently large to hold WORDCNT entries. This is indicated by block 246 in FIG. 4. In one illustrative embodiment, memory generator 246 (which indexes into hash table 232 and reads entries from hash table 232, is configured to work on bit boundaries rather than only on byte or word boundaries. This promotes more efficient usage of memory 226; although this is not required.

Memory generator 246 then allocates sufficient lexicon memory 228 to hold the compressed words in the word list, along with the word-dependent data in compressed form. Memory generator 246 also allocates sufficient memory 226 to hold codebooks 230 which can be used for decoding the compressed words and word-dependent data in lexicon memory 228. Allocating these memories is indicated by block 248 in FIG. 4.

Recall that, in the present description, the lexicon includes a word and two types of word-dependent data (the word's pronunciation, and the word's part-of-speech). The present description proceeds by referring to each of those items as a domain. In other words, the word is a domain, the first type of word-dependent data (the pronunciation) is a separate domain as is the second type of word-dependent data (the part-of-speech). Each domain has an associated alphabet. The alphabet for the English word's domain is the English alphabet (26 symbols). The alphabet for the pronunciation domain is illustratively the international phonetic alphabet (IPA), or a custom phone set. For a particular language, such as English, there are approximately 50 phones in the international phonetic alphabet. The alphabet for the parts-of-speech domain is the parts-of-speech in the language. Since the size of the alphabet in all three domains is small (e.g., less that 100 symbols) a suitable encoding algorithm can be chosen. In one illustrative embodiment, the well known Huffman encoding algorithm is used for compressing the members of each domain.

Therefore, compressed lexicon memory generator 246 first selects a word in the word list. That word is provided to hash table generator 252 which provides the word (e.g., word 253) to hashing component 224. Hashing component 224 implements any desired hashing algorithm to calculate a hash value based on word 253. This is indicated by block 254 in FIG. 4. The word hash value 256 is output by hashing component 224 and returned to hash table generator 252.

Hash table generator 252, in turn, indexes into hash table 232 to an address indicated by the word hash value 256. This is indicated by block 258 in FIG. 4. In one illustrative embodiment, hashing component 224 implements an imperfect hash algorithm. In that case, two or more words may have the same hash value. In such an embodiment, if two or more words have the same hash value, this is identified as a collision, and must be resolved using any number of desirable, and well known collision algorithms. Resolving collisions is indicated by block 260 in FIG. 4. It should also be noted, of course, that hashing component 224 can implement a perfect hashing algorithm, which guarantees that no collisions will exist. In that case, the step of resolving collisions 260 in FIG. 4 is unnecessary.

In any case, once the collisions have been resolved, if there were any, memory generator 246 determines the next available memory location in lexicon memory 228. This is indicated by block 262 in FIG. 4. This location is also provided to hash table generator 252, which writes into hash table 232 an offset value indicative of the next available location in lexicon memory 228. Writing in the offset value is indicated by block 264 in FIG. 4.

Once the next available location in lexicon memory 228 has been identified and written at the index location in hash table 232, the word for which the hash value was calculated, along with its word-dependent data (pronunciation 238 and part-of-speech 240) are provided to domain encoders 266. In one illustrative embodiment, since there are three domains in the present lexicon, there are three domain encoders 266.

Specifically, in the embodiment currently being discussed, domain encoders 266 include a word domain encoder 268, a pronunciation domain encoder 270 and a part-of-speech domain encoder 272. As discussed above, the domain encoders may illustratively implement the Huffman encoding algorithm to compress the word 236, pronunciation data 238 and part-of-speech data 240. Encoding the word and the word-dependent data domains is indicated by block 274 in FIG. 4.

Figure 5:
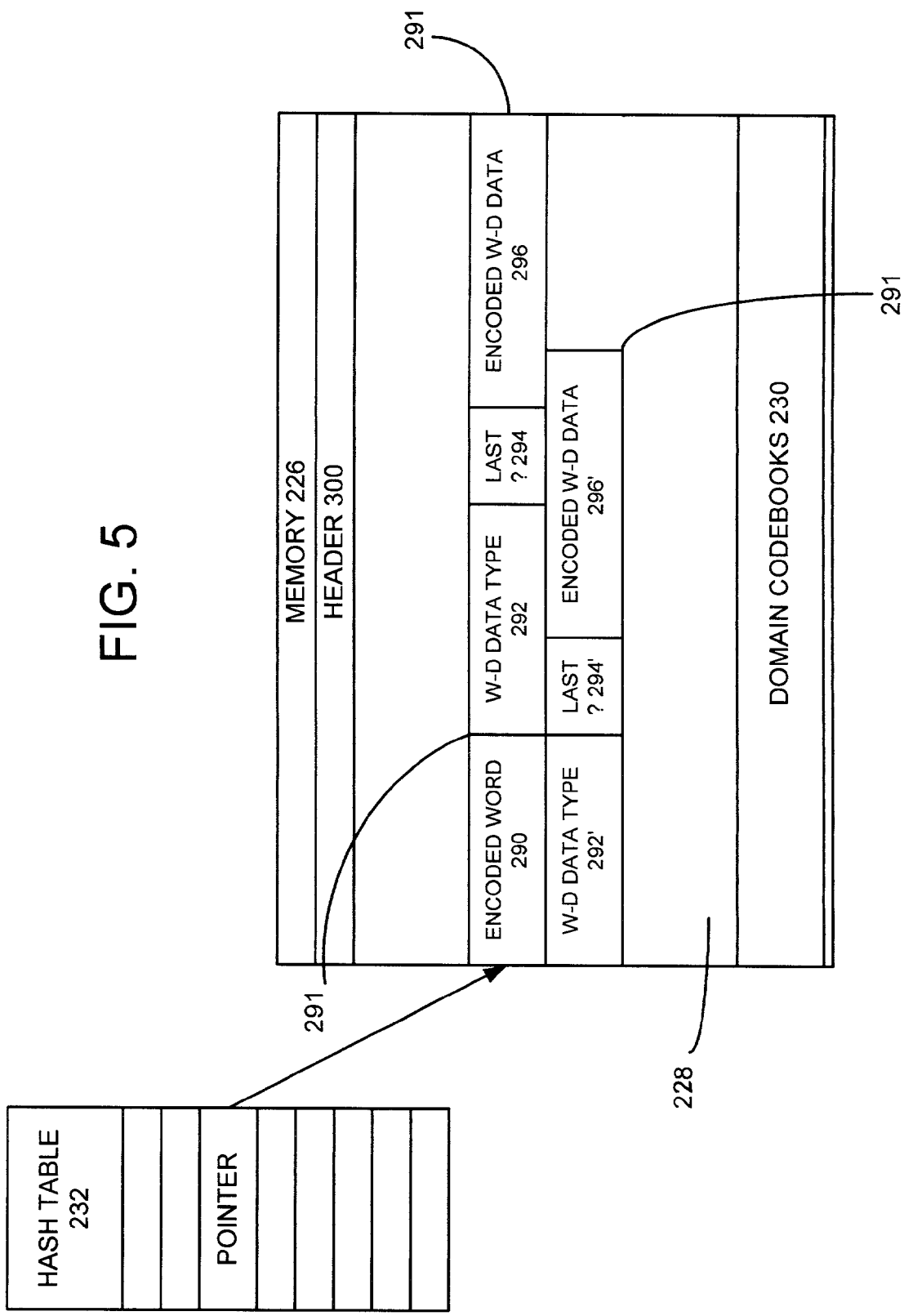
FIG. 5 illustrates a compressed lexicon data structure and associated index table in accordance with one embodiment of the present invention.

The encoded domains are then provided to memory generator 246 which writes them at the next available location in lexicon memory 228. FIG. 5 shows one illustrative structure in which the encoded information is written in lexicon memory 228, and is discussed in greater detail below. The step of writing the encoded domains to the next available location in lexicon memory 228 is indicated by block 276 in FIG. 4.

Memory generator 246 then determines whether there are any additional words in the word list 222. If so, the next word in the word list is selected and processing continues at block 250. This is indicated by block 278 in FIG. 4.

However, if all of the words and word-dependent data in the word list have been encoded and written to lexicon memory 228, then codebook generator 280 writes the codebooks 230 associated with each of the domain encoders 268, 270 and 272 into memory 226. This is indicated by block 280. This way, the compressed lexicon is created.

FIG. 5 illustrates one illustrative data structure for the compressed lexicon in memory 226. FIG. 5 better illustrates that hash table 232 is illustratively simply a list of pointers addressed based on the hash value associated with the words in the word list which has been encoded. Each pointer contains an offset into memory 226 which identifies the start of a record for that word. FIG. 5 shows that the record includes a number of fields. In the embodiment illustrated in FIG. 5, the fields include encoded word data field 290, header information which is comprised of two fields, word-dependent data type field 292 and last indicator field 294. This is followed by encoded word-dependent data field 296. Fields 292, 294 and 296 are then repeated (and are designated by numerals 292', 294' and 296') for each type of word-dependent data that is encoded for and associated with the encoded word 290. It should also be noted that, in one illustrative embodiment, encoded word field 290 and word-dependent data fields 296 and 296' are separated from the remainder of the record by a separator field 291 which can be a null value, or any other easily recognizable value.

Each field will now be discussed in greater detail. Of course, encoded word field 290 simply contains the value indicative of the encoded or compressed form of the word from the word list. The word-dependent type field 292 and the last indicator field 294 form a simple header. In one illustrative embodiment, each field 292 and 294 is composed of a single bit. The word-dependent data type field 292 indicates which type of word-dependent data is contained in the following field 296. Therefore, if the bit is a one, the type of encoded word-dependent data in the following field 296 is illustratively pronunciation information. If the bit is a zero, the type of word-dependent data encoded in field 296 is part-of-speech information. Of course, if there are more than two types of word-dependent data in the compressed lexicon, then field 292 must contain additional bits.

The last indicator field 294 is also illustratively a single bit and simply indicates whether the encoded word-dependent data field 296 is the last field in the record associated with the encoded word 290. In other words, in one embodiment, if the last field indicator bit 294 is a one, then the encoded word-dependent data in field 296 is the last portion of information contained in the record associated with encoded word 290. However, if that bit is zero, this indicates that there are additional encoded word-dependent data fields (such as 296') which are associated with encoded word 290.

Of course, the number of bits in the header fields 292 and 294 depends on the number of types of word-dependent data. If the number of types of word-dependent data is 2, then 1 bit is required for differentiating the type (in field 292) and 1 bit is needed for signaling the last word (in field 294). So 2 bits are needed for the header fields 292 and 294. If the number of types of word-dependent data is 3 or 4, then 2 bits are required for differentiating the types of 1 bit for signaling the last word. Therefore, the header fields 292 and 294 have 3 bits.

FIG. 5 also indicates that the domain codebooks 230 are stored in memory 226, and that memory 226 can contain its own header information 300, as desired.

Figure 6:
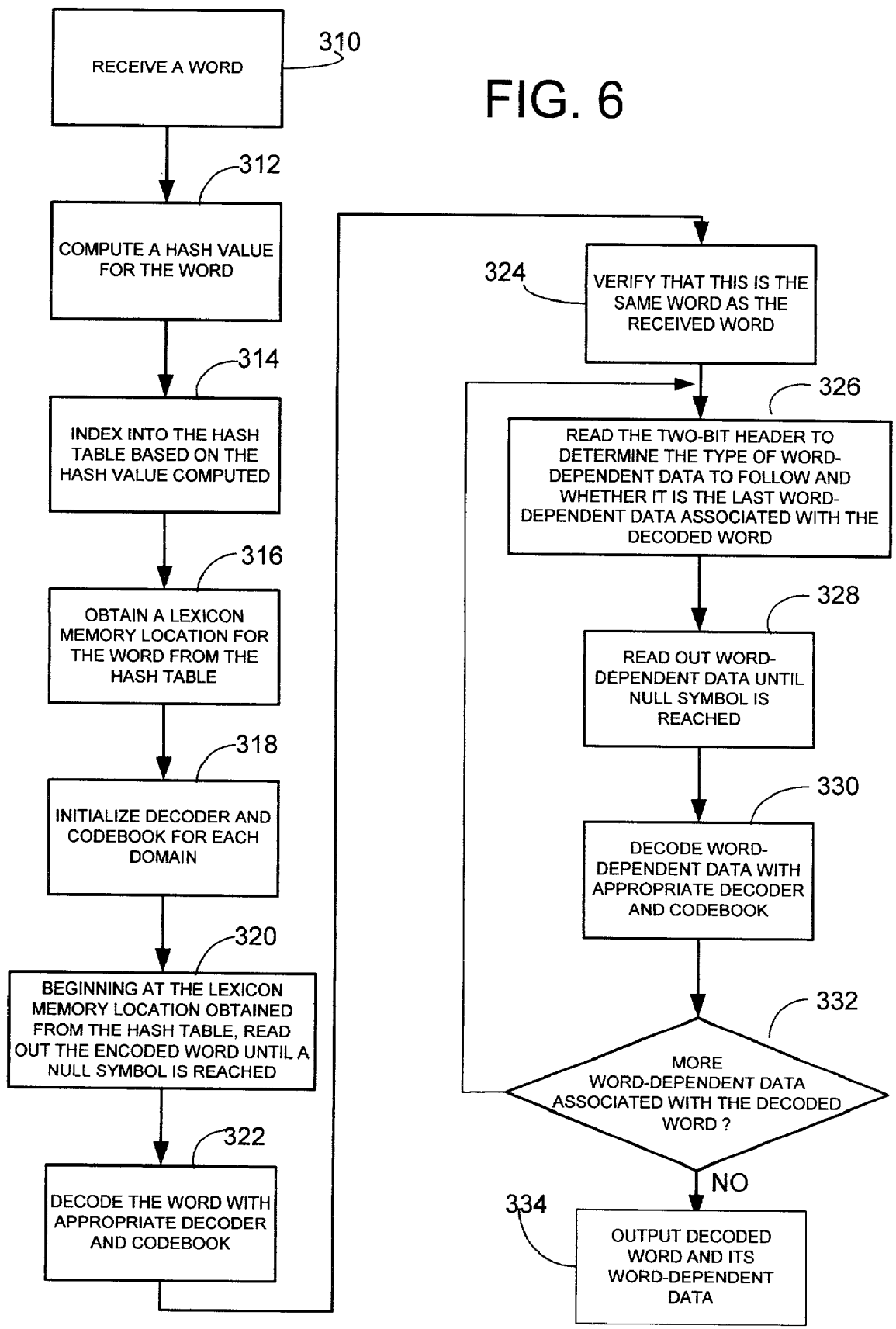
FIG. 6 is a flow diagram illustrating the accessing of information in a compressed lexicon in accordance with one embodiment of the present invention.

FIG. 6 is a flow diagram illustrating the operation of compressed lexicon accessing and building component 220 in accessing the compressed lexicon contained in memory 226. Component 220 utilizes many of the same blocks which it utilized in creating the lexicon memory. However, component 220 also utilizes domain decoders 302. As with domain encoders 266, there are illustratively the same number of domain decoders as there are domain encoders. Therefore, domain decoders 302 illustratively include a word domain decoder 304, a pronunciation domain decoder 306 and a part-of-speech domain decoder 308.

In accessing the lexicon in memory 226, component 220 first receives a word at its input and is expected to provide the word-dependent data (such as the word pronunciation or its part-of-speech) at its output. Therefore, component 220 first receives a word. This is indicated by block 310 in FIG. 6.

Component 320 provides the word to hash table generator 252, which, in turn, provides the word to hashing component 224. Hashing component 224 is illustratively the same hashing component used to create hash table 232. Therefore, hashing component 224 creates a word hash value for the word passed into it. This is indicated by block 312 in FIG. 6.

The word hash value 256 is provided from hash table generator 252 to memory generator 246. Memory generator 246 indexes into hash table 232 based on the hash value computed in block 312. This is indicated by block 314 in FIG. 6. Again, as illustrated in FIG. 5, hash table 232 simply contains a number of pointers into lexicon memory 228. The pointers identify the beginning of a record associated with the word which was received and for which the hash value was computed. Therefore, memory generator 246 obtains a lexicon memory location from hash table 232 for the word which was passed in. This is indicated by block 316 in FIG. 6.

Memory generator 246 then initializes decoders 302 and causes codebook generator 280 to initialize codebooks 230 for each domain in the lexicon memory 228. This is indicated by block 318 in FIG. 6.

Memory generator 246 then begins reading from the beginning of the record in lexicon memory 228. Therefore, memory generator 246 first reads from the offset value given in the hash table the encoded word field 290 until it encounters a null separator, or another separator 291. This is indicated by block 320. The value read from encoded word field 290 is passed to word decoder 304 which decodes the word using the codebook initialized by codebook generator 280. This is indicated by block 322. Memory generator 246 then compares the decoded word with the word which was received to ensure that they are the same. Of course, this is similar to collision avoidance. If the hashing algorithm is a perfect hashing algorithm, then it will be guaranteed that the hash value associated with a word will not lead to an erroneous location in memory. In that case, the verification step indicated by block 324 in FIG. 6 can be eliminated.

Once the proper word has been read from lexicon memory 228, and decoded, then the two bit header information in fields 292 and 294 is read by memory generator 246. Based on this information, memory generator 246 can determine what type of word-dependent data is encoded in the following word-dependent data field 296. In this way, memory generator 246 can pass the encoded word-dependent data from field 296 to the appropriate decoder 306 or 308. Based on the information in field 294, memory generator 246 can determine whether the word-dependent data in field 296 is the last word-dependent data associated with this record (or this word). This is indicated by block 326 in FIG. 6.

Once this determination is made, memory generator 246 begins reading the encoded information in the encoded word-dependent data field 296 until a null separator or other separator 291 is encountered. This is indicated by block 328.

Memory generator 246 then passes the encoded word-dependent data from field 296 to the appropriate word-dependent data decoder 306 or 308 which decodes the information with the corresponding codebook 280 which has been initialized. This is indicated by block 330 in FIG. 6.

Memory generator 246 then reads out the next header segment 292' and 294' if any additional word-dependent data is encoded for the word in the present record. If not, and the last item of word-dependent data has been read out, compressed lexicon memory generator 246 simply provides the decoded word and/or its associated decoded word-dependent data at its output. This is indicated by blocks 332 and 334 in FIG. 6.

The following is but one illustrative API for accessing information in the lexicon. The API illustrates possible part-of-speech categories, lexicon types, word types, structures and interfaces for getting, adding, and removing pronunciations. of course, any desired interface can be used.

```
//--- ISpLexicon ----------------------------------
typedef enum SPPARTOFSPEECH
{
    //--- SAPI5 public POS category values (bits 28-31)
        SPPS_NotOverriden      = -1,
        SPPS_Unknown           = 0,       // Probably from user lexicon
        SPPS_UnknownXMLTag     = 0x1000,  // Used when private tags
    are passed to engine
        SPPS_Noun              = 0x2000,
        SPPS_Verb              = 0x3000,
        SPPS_Modifier          = 0x4000,
        SPPS_Function          = 0x5000,
```

-continued

```
        SPPS_Interjection      = 0x6000,
} SPPARTOFSPEECH;
typedef enum SPLEXICONTYPE
{
    eLEXTYPE_USER           = (1L << 0),
    eLEXTYPE_APP            = (1L << 1),
    eLEXTYPE_RESERVED1      = (1L << 2),
    eLEXTYPE_RESERVED2      = (1L << 3),
    eLEXTYPE_RESERVED3      = (1L << 4),
    eLEXTYPE_RESERVED4      = (1L << 5),
    eLEXTYPE_RESERVED5      = (1L << 6),
    eLEXTYPE_RESERVED6      = (1L << 7),
    eLEXTYPE_RESERVED7      = (1L << 8),
    eLEXTYPE_RESERVED8      = (1L << 9),
    eLEXTYPE_RESERVED9      = (1L << 10),
    eLEXTYPE_RESERVED10     = (1L << 11),
    eLEXTYPE_PRIVATE1       = (1L << 12),
    eLEXTYPE_PRIVATE2       = (1L << 13),
    eLEXTYPE_PRIVATE3       = (1L << 14),
    eLEXTYPE_PRIVATE4       = (1L << 15),
    eLEXTYPE_PRIVATE5       = (1L << 16),
    eLEXTYPE_PRIVATE6       = (1L << 17),
    eLEXTYPE_PRIVATE7       = (1L << 18),
    eLEXTYPE_PRIVATE8       = (1L << 19),
    eLEXTYPE_PRIVATE9       = (1L << 20),
    eLEXTYPE_PRIVATE10      = (1L << 21),
    eLEXTYPE_PRIVATE11      = (1L << 22),
    eLEXTYPE_PRIVATE12      = (1L << 23),
    eLEXTYPE_PRIVATE13      = (1L << 24),
    eLEXTYPE_PRIVATE14      = (1L << 25),
    eLEXTYPE_PRIVATE15      = (1L << 26),
    eLEXTYPE_PRIVATE16      = (1L << 27),
    eLEXTYPE_PRIVATE17      = (1L << 28),
    eLEXTYPE_PRIVATE18      = (1L << 29),
    eLEXTYPE_PRIVATE19      = (1L << 30),
    eLEXTYPE_PRIVATE20      = (1L << 31),
} SPLEXICONTYPE;
typedef enum SPWORDTYPE
{
    eWORDTYPE_ADDED    = (1L << 0),
    eWORDTYPE_DELETED  = (1L << 1)
} SPWORDTYPE;
typedef [restricted] struct SPWORDPRONUNCIATION
{
    struct SPWORDPRONUNCIATION    * pNextWordPronunciation;
    SPLEXICONTYPE                 eLexiconType;
    LANGID                        LangID;
    WORD                          wReserved;
    SPPARTOFSPEECH                ePartOfSpeech;
    WCHAR                         szPronunciation [1];
} SPWORDPRONUNCIATION;
typedef [restricted] struct SPWORDPRONUNCIATIONLIST
{
    ULONG                         ulSize;
    BYTE                          * pvBuffer;
    SPWORDPRONUNCIATION           * pFirstWordPronunciation;
} SPWORDPRONUNCIATIONLIST;
typedef [restricted] struct SPWORD
{
    struct SPWORD                 * pNextWord;
    LANGID                        LangID;
    WORD                          wReserved;
    SPWORDTYPE                    eWordType;
    WCHAR                         * pszWord;
    SPWORDPRONUNCIATION           * pFirstWordPronunciation;
} SPWORD;
typedef [restricted] struct SPWORDLIST
{
    ULONG                         ulSize;
    BYTE                          * pvBuffer;
    SPWORD                        * pFirstWord;
} SPWORDLIST;
[
    object,
    uuid(DA41A7C2-5383-4db2-916B-6C1719E3DB58),
    helpstring ("ISpLexicon Interface"),
    pointer_default (unique),
    restricted
]
```

```
-continued interface ISpLexicon : IUnknown
{
    HRESULT GetPronunciations(
            [in] const WCHAR * pszWord,
            [in] LANGID LangID,
            [in] DWORD dwFlags,
            [in, out] SPWORDPRONUNCIATIONLIST *
pWordPronunciationList
            );
HRESULT AddPronunciation(
            [in] const WCHAR * pszWord,
            [in] LANGID LangID,
            [in] SPPARTOFSPEECH ePartOfSpeech,
            [in] const WCHAR * pszPronunciation
            );
HRESULT RemovePronunciation(
            [in] const WCHAR * pszWord,
            [in] LANGID LangID,
            [in] SPPARTOFSPEECH ePartOfSpeech,
            [in] const WCHAR * pszPronunciation
            );
};
```

It can thus be seen that, by decoding the domains separately, and using hash table 232, an enormous amount of information can be compressed, yet be accessed very quickly. Similarly, by using the simple header scheme in fields 292 and 294, and by using appropriate separators, the lexicon compressed in accordance with the present invention can easily be extended such that additional words can be added or additional word-dependent data can be added for individual entries. Similarly, this allows the portions containing the compressed words and word-dependent data to be variable lengths. Also, the present invention is designed to be language-independent. In other words, since the lexicon is extensible, and since the individual encoded domains of the lexicon can be variable length, the fundamental operation of the present system remains unchanged regardless of the particular language being compressed. Therefore, the present invention provides significant advantages over prior art systems.

It should also be noted that any number of the components in FIG. 3 can be combined, as desired.

Although the present invention has been described with reference to particular embodiments, workers skilled in the art will recognize that changes may be made in form and detail without departing from the spirit and scope of the invention.

What is claimed is:

1. A method of building a compressed speech lexicon for use in a speech application, comprising:
  receiving a word list configured for use in the speech application, the word list including a plurality of words, with each word in the word list having associated word-dependent data selected from the group consisting of a pronunciation and part-of-speech;
  selecting one of the words from the word list;
  generating an index entry identifying a location in a compressed speech lexicon memory for holding the selected word;
  encoding the selected word and its associated word-dependent data to obtain encoded words and associated encoded word-dependent data; and
  writing the encoded word and its associated word-dependent data at the identified location in the speech lexicon memory.

2. The method of claim 1 and further comprising:
  repeating the steps of selecting, generating, encoding and writing for each word in the word list and the associated word-dependent data.

3. The method of claim 2 and further comprising:
  writing codebooks corresponding to the encoded words and the encoded word-dependent data in the speech lexicon memory.

4. The method of claim 1 wherein receiving the word list comprises:
  counting the words in the word list;
  allocating a hash table memory based on a number of words in the word list; and
  allocating a speech lexicon memory based on the number of words in the word list.

5. The method of claim 1 wherein encoding comprises:
  providing a word encoder to encode the words in the word list and encoding the words with the word encoder; and
  providing word-dependent data encoders for each type of word-dependent data in the word list and encoding the word-dependent data with the word-dependent data encoders.

6. The method of claim 5 wherein encoding further comprises:
  Hufmann encoding the selected word and its associated word-dependent data.

7. The method of claim 1 wherein writing the encoded word and word-dependent data comprises:
  writing a data structure comprising:
    a word portion containing the encoded word;
    a word-dependent data portion containing the encoded word-dependent data; and
    wherein each word-dependent data portion has an associated last indicator portion and word-dependent data indicator portion, the last indicator portion containing an indication of a last portion of word-dependent data associated with the selected word, and the word-dependent data indicator portion containing an indication of the type of word-dependent data stored in the associated word dependent data portion.

8. The method of claim 7 wherein writing a data structure comprises writing the word portion and the word-dependent data portions as variable length portions followed by a separator.

9. The method of claim 1 wherein generating an index entry comprises:
  determining a next available location in the speech lexicon memory.

10. The method of claim 9 wherein generating an index entry comprises:
  calculating a hash value for the selected word;
  indexing into the hash table to an index location based on the hash value; and
  writing location data identifying the next available location in the speech lexicon memory into the index location in the hash table.

11. The method of claim 10 wherein writing location data comprises:
  writing an offset into the speech lexicon memory that corresponds to the next available location in the speech lexicon memory.

12. A method of accessing word information related to a word stored in a compressed speech lexicon, comprising:
  receiving the word;
  accessing an index to obtain a word location in the compressed speech lexicon that contains information associated with the received word including word-dependent data selected from the group consisting of a pronunciation and a part-of-speech;
  reading encoded word information from the word location; and
  decoding the word information for use in a speech application.

13. The method of claim 12 and further comprising:
  prior to reading the encoded word information, reading an encoded word from the word location;
  decoding the encoded word; and
  verifying that the decoded word is the same as the received word.

14. The method of claim 12 wherein decoding the word information comprises:
  initializing decoders associated with the word and its associated information.

15. The method of claim 12 wherein accessing an index comprises:
  calculating a hash value based on the received word;
  finding an index location in the index based on the hash value; and
  reading from the index location a pointer value pointing to the word location in the compressed lexicon.

16. The method of claim 12 wherein reading the encoded word information comprises:
  reading a plurality of fields from the word location containing variable length word information.

17. The method of claim 16 wherein reading a plurality of fields comprises:
  prior to reading each field, reading data type header information indicating a type of word information in an associated field.

18. The method of claim 17 wherein reading a plurality of fields comprises:
  reading a last field indicator indicating whether an associated one of the plurality of fields is a last field associated with the received word.

19. A compressed speech lexicon builder for building a compressed speech lexicon for use in a speech application based on a word list containing a plurality of domains, the domains including words and word-dependent data associated with each of the words, the compressed speech lexicon builder comprising:
  a plurality of domain encoders, one domain encoder being associated with each domain in the word list, the domain encoders being configured to compress the words and the associated word-dependent data selected from the group consisting of a pronunciation and a part-of-speech, to obtain compressed words and compressed word-dependent data;
  a hashing component configured to generate a hash value for each word in the word list;
  a hash table generator, coupled to the hashing component, configured to determine a next available location in a speech lexicon memory and write, at an address in a hash table identified by the hash value, the next available location in the speech lexicon memory; and
  a speech lexicon memory generator, coupled to the domain encoders and the hash table generator, configured to store in the speech lexicon memory, for use by the speech application, the compressed words and compressed word-dependent data, each compressed word and its associated compressed word-dependent data being stored at the next available location in the speech lexicon memory written in the hash table at the hash table address associated with the compressed word.

20. The compressed speech lexicon builder of claim 19 and further comprising:
  a codebook generator generating a codebook associated with each domain encoder.

* * * * *